(12) United States Patent
Whitfield

(10) Patent No.: US 9,337,499 B2
(45) Date of Patent: May 10, 2016

(54) DUAL ELECTROLYTE FUEL CELL ASSEMBLY

(71) Applicant: Roger Ray Whitfield, St. George Island, FL (US)

(72) Inventor: Roger Ray Whitfield, St. George Island, FL (US)

( * ) Notice: Subject to any disclaimer, the term of this patent is extended or adjusted under 35 U.S.C. 154(b) by 298 days.

(21) Appl. No.: 14/098,904

(22) Filed: Dec. 6, 2013

(65) Prior Publication Data

US 2015/0162624 A1 Jun. 11, 2015

(51) Int. Cl.
*H01M 8/04* (2016.01)
*H01M 8/02* (2016.01)
*H01M 8/10* (2016.01)
*H01M 8/24* (2016.01)
*H01M 8/12* (2016.01)

(52) U.S. Cl.
CPC .......... *H01M 8/0256* (2013.01); *H01M 8/0204* (2013.01); *H01M 8/0271* (2013.01); *H01M 8/04089* (2013.01); *H01M 8/1004* (2013.01); *H01M 8/241* (2013.01); *H01M 8/2475* (2013.01); *H01M 8/0228* (2013.01); *H01M 2008/1293* (2013.01); *Y02E 60/521* (2013.01)

(58) Field of Classification Search
CPC .......................... H01M 8/0256; H01M 8/0258
See application file for complete search history.

(56) References Cited

U.S. PATENT DOCUMENTS 6,194,095 B1 * 2/2001 Hockaday ............. H01M 4/881
429/413

* cited by examiner

*Primary Examiner* — Stewart Fraser
*Assistant Examiner* — Olatunji Godo
(74) *Attorney, Agent, or Firm* — J. Wiley Horton

(57) ABSTRACT

A fuel cell assembly in which one or more dual cell modules is created by "sandwiching" a first reactant chamber between two electrolyte assemblies and enclosing the result within a surrounding vessel containing the second reactant. Each dual cell module thereby contains two operating electrolyte assemblies. In such a configuration separate electrical conductors must be provided to create the proper connections. In order to avoid the resistance losses inherent in the use of edge connections, the present invention preferably includes conductors that actually pass through the electrolytes. These conductors are contained within an assembly that electrically insulates the conductor where needed and provides a gas-tight seal where needed.

20 Claims, 15 Drawing Sheets

DUAL ELECTROLYTE FUEL CELL ASSEMBLY

CROSS-REFERENCES TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of fuel cells. More specifically, the invention comprises a novel fuel cell construction using two electrolytes per unit and internal electrical connections rather than edge connections.

2. Description of the Related Art

Although the operation of a conventional fuel cell is well understood by those skilled in the art, some explanation of the terminology of the components and the operation of the assembly will aid the reader's understanding. FIG. 1 shows a prior art fuel cell assembly having only one cell. In general, a fuel cell includes two reactants that are physically separated by some type of electrolyte. There are many types of fuel cells, and they are often categorized according to the type of electrolyte used. The particular example shown in FIG. 1 uses a proton exchange membrane ("PEM") for electrolyte 14. It is commonly called a "PEM" fuel cell.

The proton exchange membrane ("PEM") is flanked by a pair of porous electrodes. Anode 12 is located on a first side of the PEM and cathode 16 is located on the other side. A gas diffusion layer is also located on each side of the PEM. Hydrogen diffusion layer 30 is located on the left side in the orientation of FIG. 1. Oxygen diffusion layer 32 is located on the right side. Hydrogen inlet 18 feeds gaseous hydrogen into the hydrogen diffusion layer, while oxygen inlet 20 feeds gaseous oxygen into the oxygen diffusion layer. A "diffusion layer" may be created using many known techniques. A diffusion layer is commonly created using a sealed manifold containing the particular flowing reactant gas.

Negative charge collector 54 is in contact with hydrogen diffusion layer 30 while positive charge collector 56 is in contact with oxygen diffusion layer 32. External conductor path 22 electrically connects the negative charge collector to the positive charge collector. Electrical load 24 is placed in this conductor path. A typical goal for the operation of such a fuel cell is the creation of an electrical current in the external conductor path which is used to provide energy to electrical load 24.

The operation of the exemplary PEM fuel cell of FIG. 1 will now be described in detail. Two electrochemical reactions are required for the operation of the fuel cell—an anode reaction and a cathode reaction. The anode reaction for a PEM cell may be written as:

$$H_2 \rightarrow 2H^+ + 2e^-$$

The cathode reaction may be written as:

$$\frac{1}{2}O_2 + 2H^+ + 2e^- \rightarrow H_2O$$

The overall reaction may then be written as:

$$H_2 + \frac{1}{2}O_2 \rightarrow H_2O$$

Catalysts are generally required to facilitate the reactions. The anode catalyst is typically nickel or platinum powder deposited in a very thin layer on the porous anode. Flow channeling devices are typically used to force the gaseous hydrogen to flow along a long, serpentine path so that it remains in contact with the catalyst for an extended period. The catalyst facilitates the splitting of the diatomic hydrogen into free hydrogen nuclei (free protons) and free electrons.

The proton exchange membrane is configured to allow the passage of free protons (the hydrogen nuclei) but to prevent the passage of the free electrons. Thus, the hydrogen nuclei pass through the PEM but the free electrons cannot. Instead, the free electrons are collected by negative charge collector 54 and forced to flow through external conductor path 22. The free electrons pass through positive charge collector 56 and ultimately to cathode 16.

At the cathode the free electrons combine with the oxygen and the hydrogen nuclei passing through the PEM to form water. A catalyst is generally used for the cathode reaction as well, with platinum being a common example.

Many other components are included in actual PEM fuel cell designs. These include:

(1) Channels for removing the water formed at the cathode;
(2) Devices for maintaining the appropriate conditions for the PEM;
(3) Cooling devices for removing excess heat produced by the electrochemical reactions; and
(4) Gas throttling valves for controlling the output of the fuel cell.

FIG. 2 depicts a different type of fuel cell in which a solid oxide is used for electrolyte 14. This type is often referred to as a "SO" fuel cell. Most commonly a yttria-stabilized zirconia is used as the electrolyte. SO fuel cells operate at relatively high temperatures (800 to 1,000 degrees centigrade). The anode and cathode reactions differ from the reactions existing in a PEM cell. The anode reaction for an SO cell may be written as:

$$H_2 + O^{2-} \rightarrow H_2O + 2e^-$$

The cathode reaction may be written as:

$$\frac{1}{2}O_2 + 2e^- \rightarrow O^{2-}$$

The overall reaction may again be written as:

$$H_2 + \frac{1}{2}O_2 \rightarrow H_2O$$

The current vector in the device is the same as for the PEM cell, but of course the ions move in the opposite direction. In the SO fuel cell, an ionized oxygen atom moves from the cathode side of the electrode toward the anode side. Thermal management and water removal may also pose differing challenges. However, the conceptual operation of PEM cell and the SO cell are grossly similar.

As those skilled in the art will know, the voltage produced by an individual cell such as shown in FIG. 1 or 2 is quite small—typically in the range of 0.7V. The electrical current produced by each cell is a function of charge accumulation. Thus, one may linearly increase the current produced by increasing the surface area of the components. Larger anodes and cathodes produce more current. The voltage, however, is fixed by the electrochemical reactions themselves.

The low voltage produced by a single cell is not very useful, particularly if it must be conveyed for any significant distance. The solution to this problem is to "stack" multiple cells together in the same way that single battery cells are stacked to increase voltage. FIG. 3 provides a conceptual depiction of a "stacked" arrangement of two SO fuel cells. Cell "A"— shown on the left—is identical to the single cell shown in FIG. 2. Cell "B"—shown on the right—is also identical.

However, the external electrical circuits have been reconfigured to stack the voltage produced. The reader will observe that external conductor path 22 has been connected from negative charge collector 54 on Cell A to positive charge collector 56 on Cell B. Linking circuit 34 has been used to connect negative charge collector 54 on Cell B to positive charge collector 56 on Cell A. As a result, free electrons created by the anode reaction in Cell A are transported by external conductor path 22 to the cathode reaction in Cell B (where they react with diatomic oxygen to form oxygen atoms). Free electrons formed by the anode reaction in Cell B are transported via linking circuit 34 to the cathode reaction in Cell A.

Those skilled in the art will quickly realize that linking circuit 34 may be eliminated by simply pushing positive charge collector 56 of Cell A and negative charge collector 54 of Cell B together (providing that the mating surfaces of the charge collectors are suitably conductive). This is in fact what is done in most fuel cell "stack" assemblies. FIG. 4 shows this configuration, with the exception of separator plate 36 being substituted for a pair of mating charge collector plates. Separator plate 36 is made of conductive material. It must be able to survive exposure to the charged gaseous oxygen environment on one side and the charged gaseous hydrogen environment on the other.

Looking at the configuration of FIG. 4, the reader will realize that the two cell stack shown could be expanded to three cells, four cells, or any desired additional number. FIG. 5 shows a prior art design using this approach in which six cells (A through F) have been stacked in series. If each cell produces 0.7 volts, then a stack of six such cells will (neglecting losses) produce 4.2 volts. Thus, a fuel cell designer using the prior art approach is able to: (1) produce increasing current by increasing the surface area of the components, and (2) produce increasing voltage by increasing the number of individual fuel cells in the stack.

Additionally, the mechanical arrangement allows the entire assembly to be held together using sets of tie rods that pass through the assembly. The ends of the tie rods are threaded and nuts are tightened on these threaded ends to clamp the stack together. Suitable insulating and sealing components are of course added to the tie rods so that the reactants don't leak and no electrical short circuits are created.

The back-to-back stack approach does, however, have some recognized shortcomings. These include, among others: (1) The separator plate must be made of a material that can resist the oxidizing and reducing environments, (2) The tightly packed nature causes heat dissipation problems; (3) The tightly packed nature causes problems with feeding in the reactant gases.

BRIEF SUMMARY OF THE PRESENT INVENTION

The present invention comprises a fuel cell assembly in which one or more dual cell modules is created by "sandwiching" a first reactant chamber between two electrolyte assemblies and enclosing the result within a surrounding vessel containing the second reactant. Each dual cell module thereby contains two operating electrolyte assemblies. For example, a dual cell module may be created by sandwiching a hydrogen diffusion layer between two solid oxide electrolyte assemblies. The surrounding vessel would then be flooded with oxygen.

In such a configuration it is not possible to physically stack multiple cells together in order to create a series electrical connection and thereby increase the voltage produced. Instead, separate electrical conductors must be provided to create the proper connections. In order to avoid the resistance losses inherent in the use of edge connections, the present invention preferably includes conductors that actually pass through the electrolytes. These conductors are contained within an assembly that electrically insulates the conductor where needed and provides a gas-tight seal where needed. Each conductor assembly is referred to as a "via."

Figure 1:
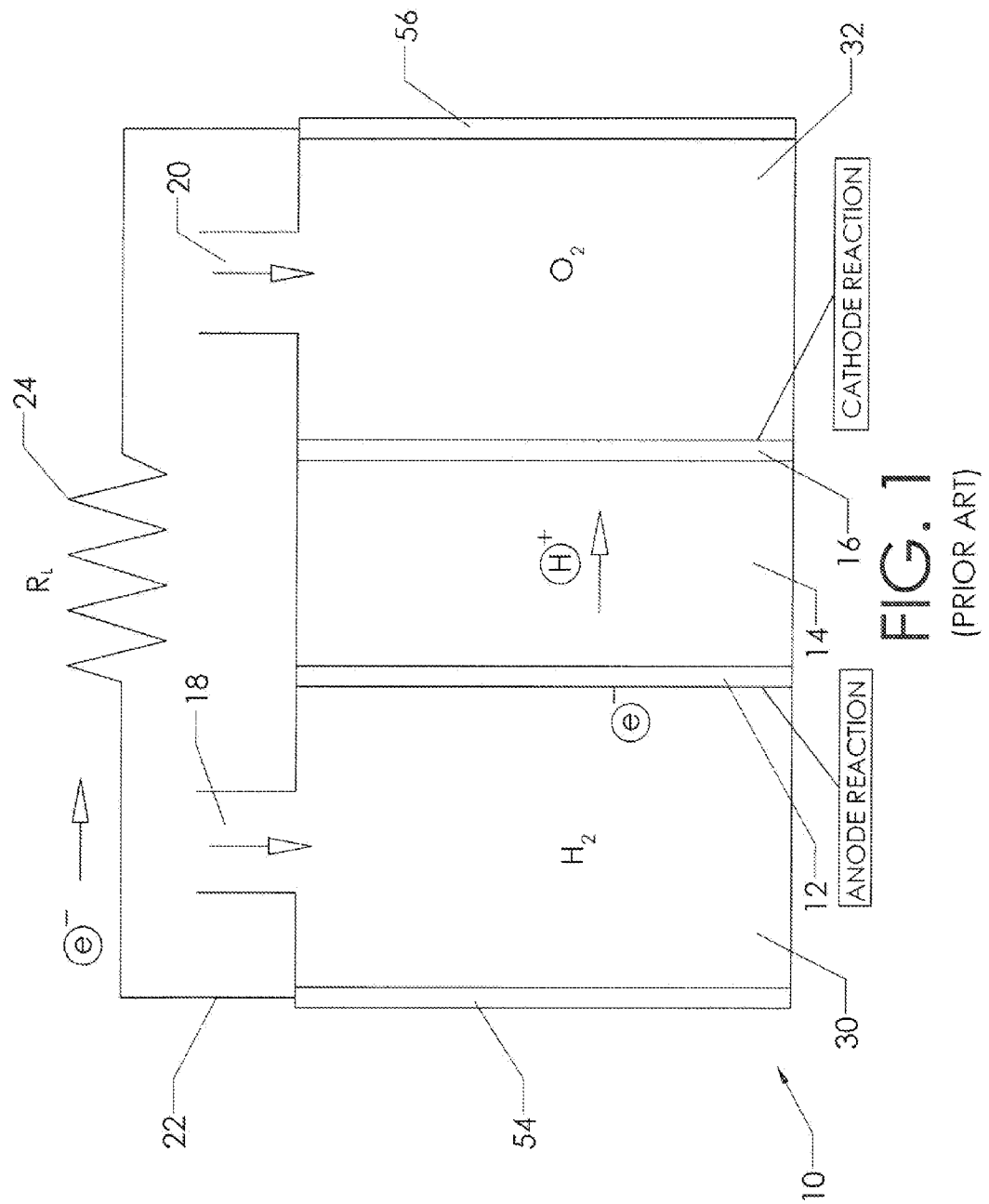
FIG. 1 is a schematic view, showing a prior art proton exchange membrane fuel cell.
Figure 2:
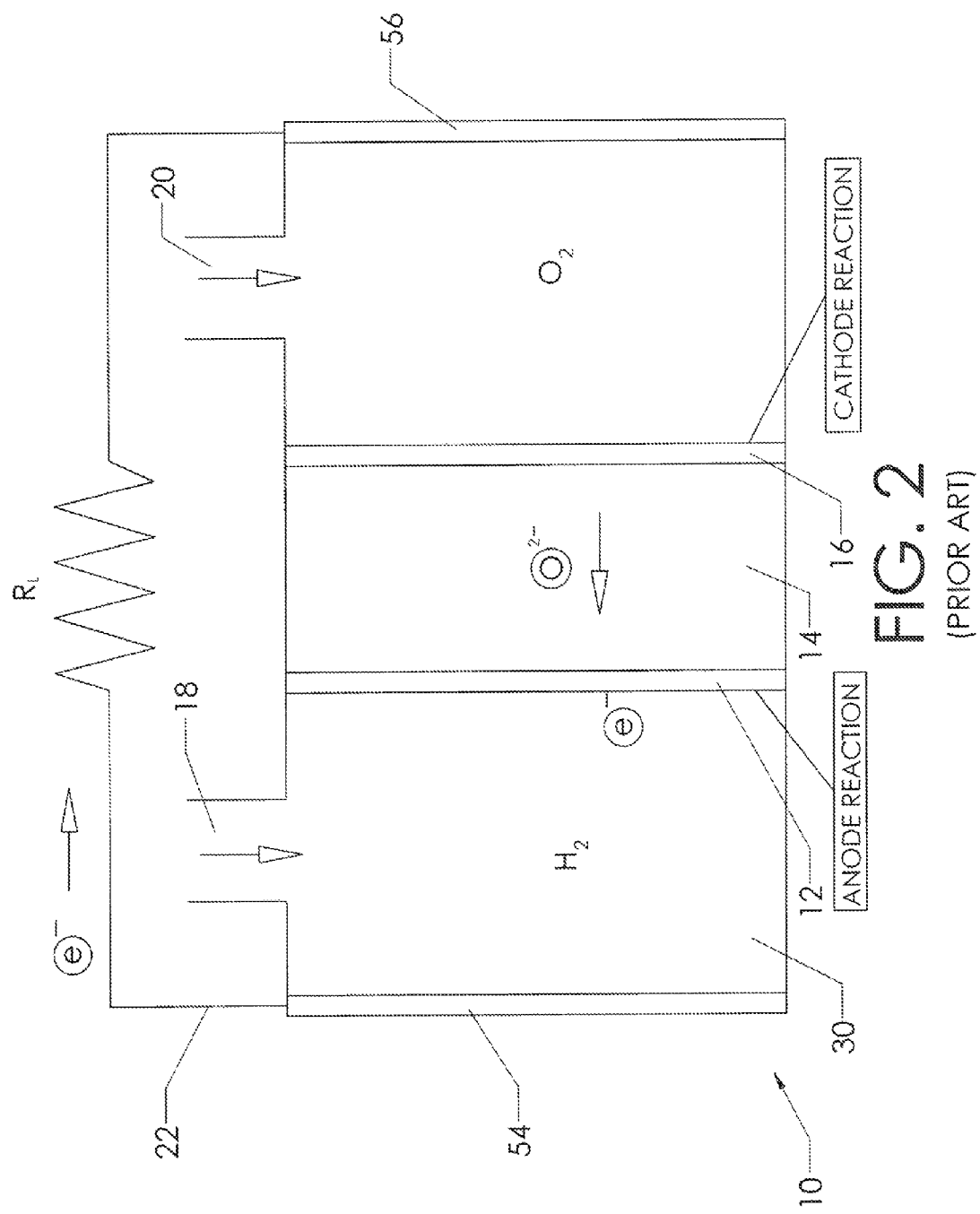
FIG. 2 is a schematic view, showing a prior art solid oxide electrolyte fuel cell.
Figure 3:
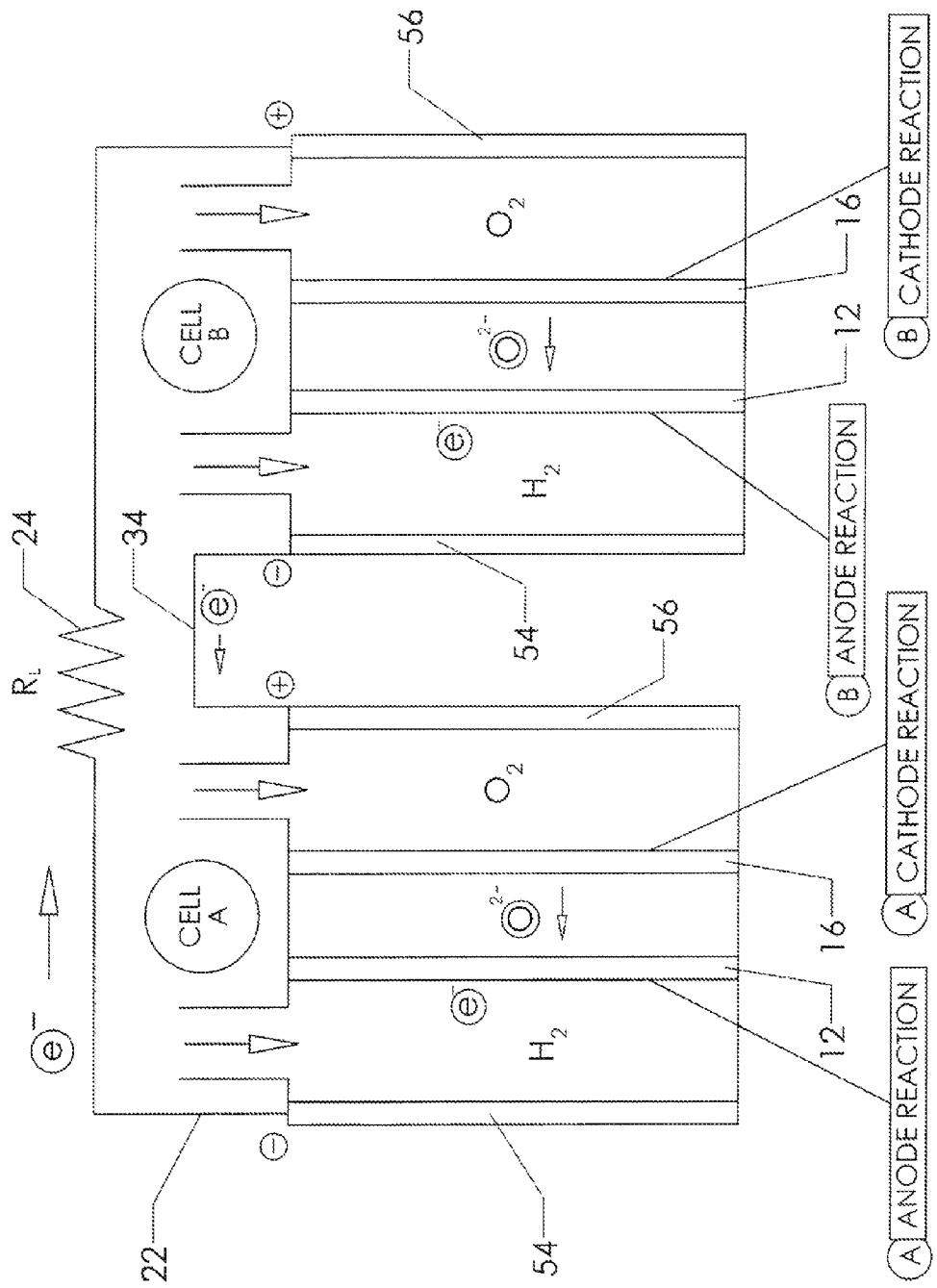
FIG. 3 is a schematic view, showing two prior art fuel cells connected in series to increase the voltage.

| REFERENCE NUMERALS IN THE DRAWINGS | | | |
|---|---|---|---|
| 10 | fuel cell | 12 | anode |
| 14 | electrolyte | 16 | cathode |
| 18 | fuel inlet | 70 | oxygen inlet |
| 22 | external conductor path | 24 | electrical load |
| 30 | hydrogen diffusion layer | 32 | oxygen diffusion layer |
| 34 | linking circuit | 36 | separator plate |
| 38 | vessel | 40 | via |
| 42 | master anode | 44 | master cathode |
| 46 | conductor | 48 | insulator/seal |
| 50 | dual cell module | 52 | attachment |
| 54 | negative charge collector | 56 | positive charge collector |

DETAILED DESCRIPTION OF THE INVENTION

The present invention includes a novel arrangement for the components of a fuel cell, in which two electrolytes are connected to a single reactant chamber. Internal electrical conduits preferably carry the electricity produced from cell to cell so that the voltage produced may be stacked in series without the need for edge connections.

Figure 6:
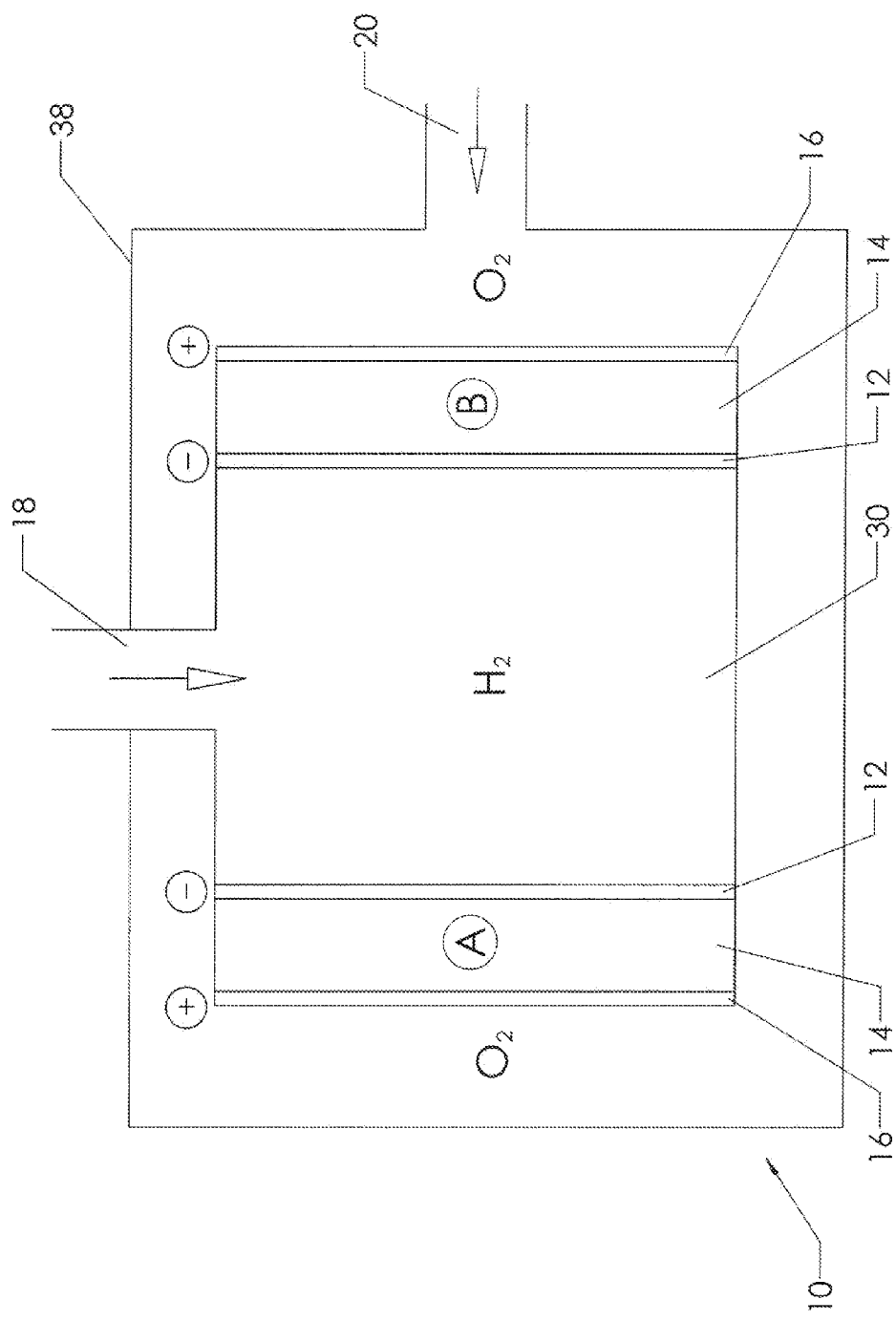
FIG. 6 is a schematic view, showing a dual electrolyte fuel cell made according to the present invention.

FIG. 6 shows a dual cell module constructed according to the present invention. As for the prior art, separate chambers are used for the fuel and oxidizer. The fuel and oxidizer chambers may be reversed if desired. In the embodiment of FIG. 6, vessel 38 holds a supply of gaseous oxygen fed in through oxygen inlet 20. Gaseous hydrogen is fed into hydrogen diffusion layer 30 by hydrogen inlet 18.

A pair of electrolytes 14 flank hydrogen diffusion layer 30. The diffusion layer is segregated from the surrounding vessel using suitable walls (thereby forming a hydrogen manifold). The particular embodiment shown is a solid oxide fuel cell. The term "electrolyte assembly" means an assembly of an electrolyte and a cathode on a first side of the electrolyte and an anode on the second side of the electrolyte. The location of the anode and cathode is determined by the reactant that is in the adjoining chamber. For example, in the embodiment of FIG. 6, hydrogen is placed in the diffusion layer 30. The example being a solid oxide-type cell, the placement of the hydrogen means that anode 12 must lie between the hydrogen and electrolyte 14. The cathode 16 lies on the opposite side of the electrolyte. Hydrogen diffusion layer 30 is sealed off from the surrounding oxygen inside vessel 38 but it is open to the two electrolyte assemblies.

Vessel 38 contains the second reactant diffusion layer. In the embodiment shown, the second reactant diffusion layer contains oxygen. The oxygen surrounds the first reactant diffusion layer (hydrogen diffusion layer 30) and the two electrolyte assemblies.

The electrolyte assembly at "A" includes anode 12 on the hydrogen side and cathode 16 on the oxygen side of electrolyte 14. Electrolyte assembly "B" likewise includes anode 12 on the hydrogen side and cathode 16 on the oxygen side. The reader will thereby discern that the assembly shown in FIG. 6 actually includes two complete fuel cells. Unlike the prior art stacked designs, no separator plate is required. The elimination of the separator plate is considered advantageous since, in the prior art designs, the separator plate must be both conductive and able to withstand the oxidizing environment on one side and the reducing environment on the other.

This assembly is referred to as a "dual cell module." It is the basic building block of an operational fuel cell using the inventive technology. In the prior art a first reactant chamber is paired with a second reactive chamber with an electrolyte assembly in between. In the present invention a first reactant chamber is paired with a surrounding volume of a second reactant and two electrolyte assemblies are present.

Figure 4:
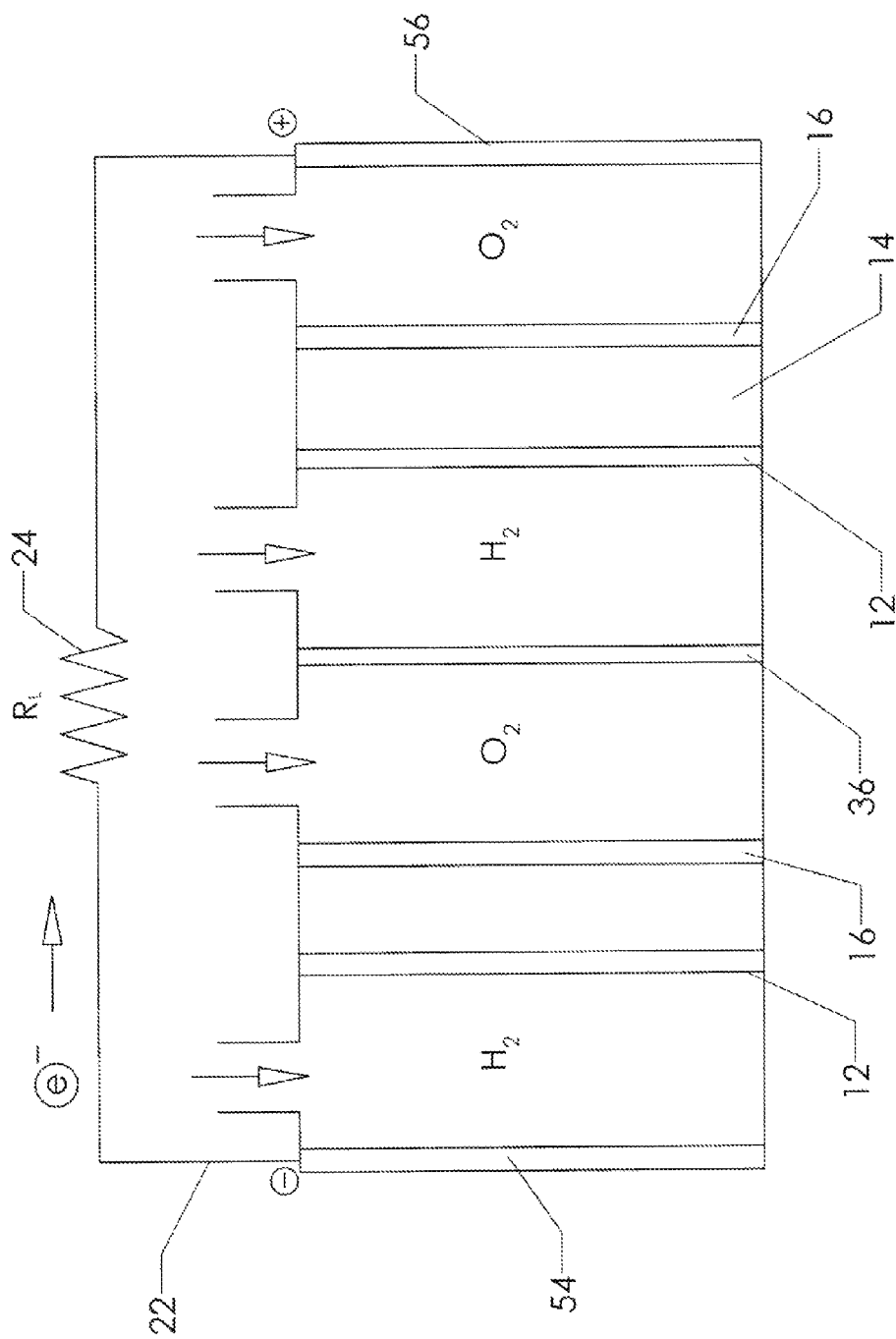
FIG. 4 is a schematic view, showing two prior art fuel cells connected in series using a separator plate.
Figure 5:
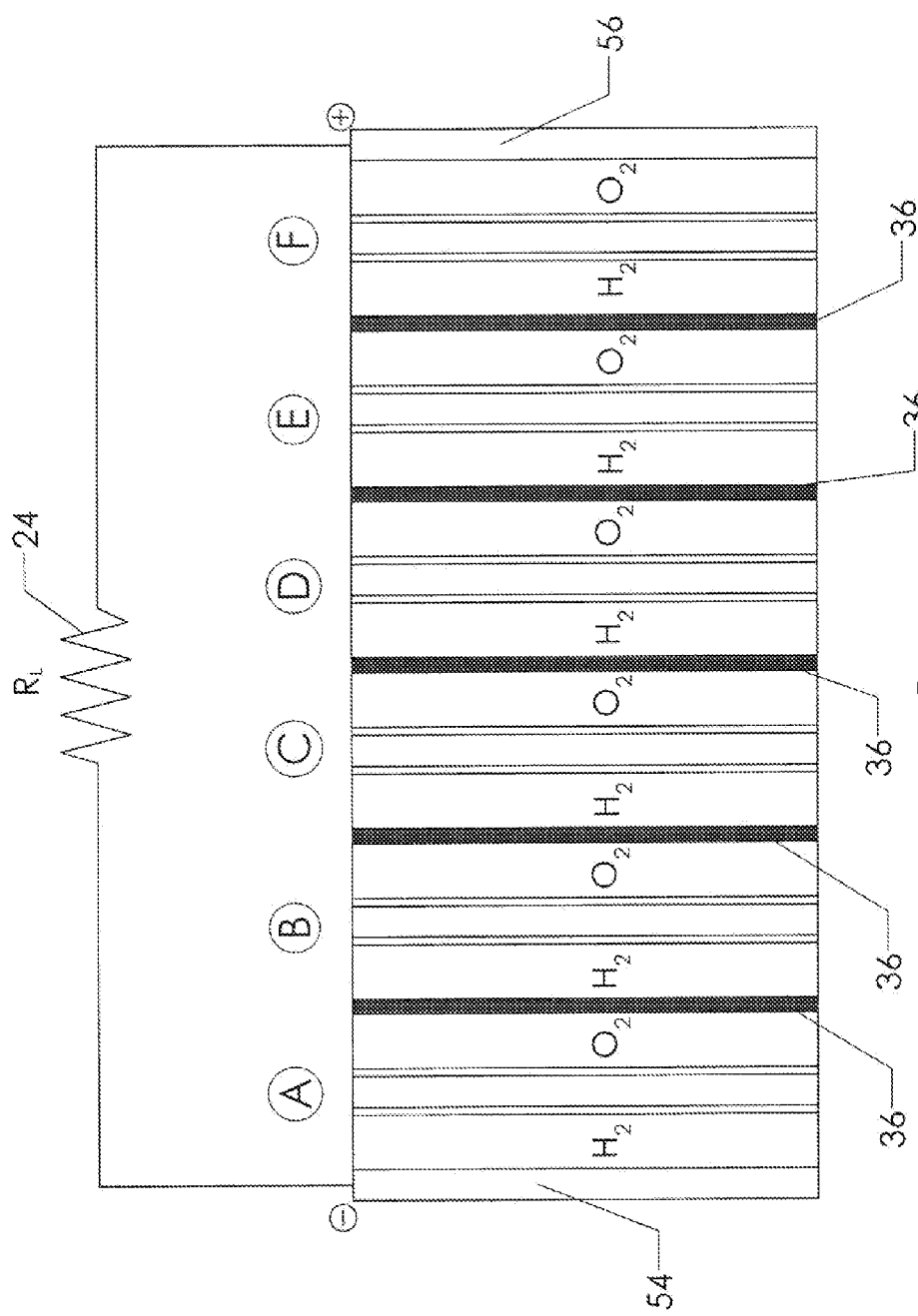
FIG. 5 is a schematic view, showing a prior art stack of six fuel cells.
Figure 7:
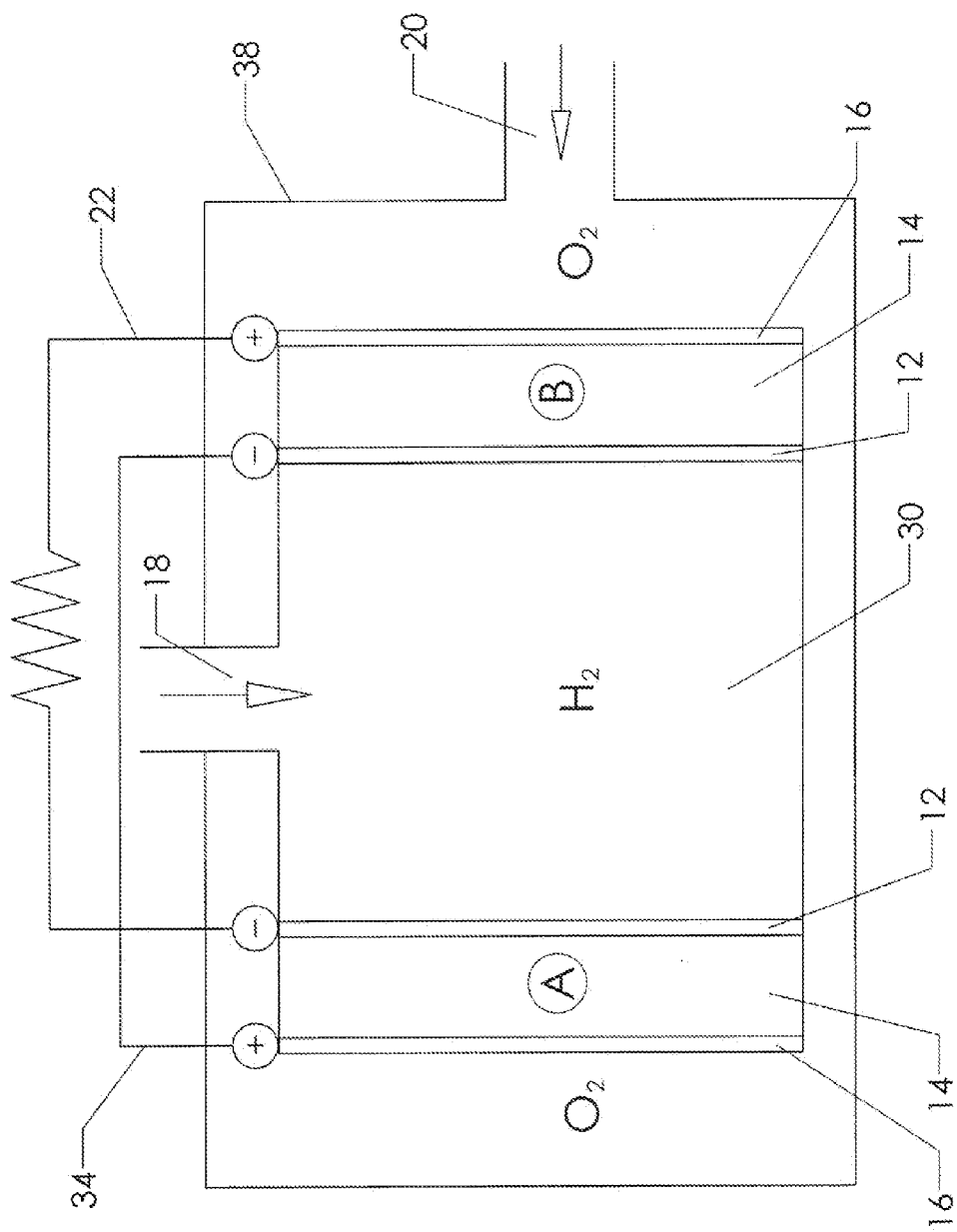
FIG. 7 is a schematic view, showing the creation of an electrical circuit that is suitable for use with the fuel cell of FIG. 6.

The reader will also discern, however, that the simple stacking arrangement for assembling multiple cells in series (as in FIG. 4) is not possible for the assembly of FIG. 6. The assembly of FIG. 6 includes two cells, but appropriate conductor paths must be provided to "wire" them in series. FIG. 7 schematically depicts the electrical connections needed to place the two cells in series. External conductor path 22 in this example is connected between cathode 16 of cell B (+) and anode 12 of Cell A (−). Linking circuit 34 is connected between anode 12 of cell B(−) and cathode 16 (+) of cell A.

The operation of the assembly thus connected is as follows: Diatomic gaseous oxygen is ionized at the cathode on each side of the assembly. The ionized oxygen nuclei then flow inward, across the two electrolytes 14. The oxygen nuclei combine with ionized hydrogen nuclei at the two anodes 12 to form water and free electrons. The free electrons formed at the anode in cell B are carried by linking circuit 34 to the cathode at cell A, where they react to form ionized oxygen. The free electrons formed at the anode of cell A are carried by external conductor path 22 to the cathode at cell B, where they also react to form ionized oxygen.

Physical connections such as those depicted in FIG. 7 are "edge" connections, meaning that a conduit is typically attached to an exposed edge of the plate that is a cathode or anode. The use of such edge connections creates an inherent limitation. As those skilled in the art know, a fuel cell designer is often seeking to meet specified voltage and current requirements for the complete fuel cell assembly. Voltage may be increased by linking additional cells together in series. Current is generally increased by increasing the surface area of the electrolyte assembly—the anode, cathode, and electrolyte itself (increasing the "plate size").

If the voltage produced by a given plate is only extracted at the plate's edge, then a significant increase in plate size introduces unacceptable internal resistance losses. A simple consideration of two examples illustrates this point. A small fuel cell might use a plate size of 10 centimeters by 10 centimeters. If the current produced by the anode and cathode is extracted using a single conductor along one entire edge of the anode or cathode, then the maximum distance between a point of current creation and the point of current extraction is 10 cm.

A larger fuel cell might use a plate size of 100 cm by 100 cm. The maximum distance is then 100 cm. The resistance of a conductor is generally proportional to its length. Thus, the resistance losses for the longest run on the large fuel cell are 10 times greater than for the longest run on the small fuel cell. Given the fact that nominal voltage produced in a hydrogen/oxygen fuel cell is only about 0.7 V, one may easily see that increasing the plate size for a fuel cell rapidly reaches a problem with diminishing returns.

A prior art solution to this problem has been assembling series-connected stacks of "small" fuel cells in parallel to increase the total current and reduce resistance losses within each cell. While this solution does work, it requires an assembly of considerable complexity. The present invention preferably avoids this problem by eliminating the use of edge connections. Instead, the present invention passes the electrical current through the electrolytes themselves using one or more conductor assemblies referred to as "vias." Each via preferably includes a conductor, an insulating surrounding material, and one or more sealing components designed to prevent the leakage of the reactants.

Figure 8:
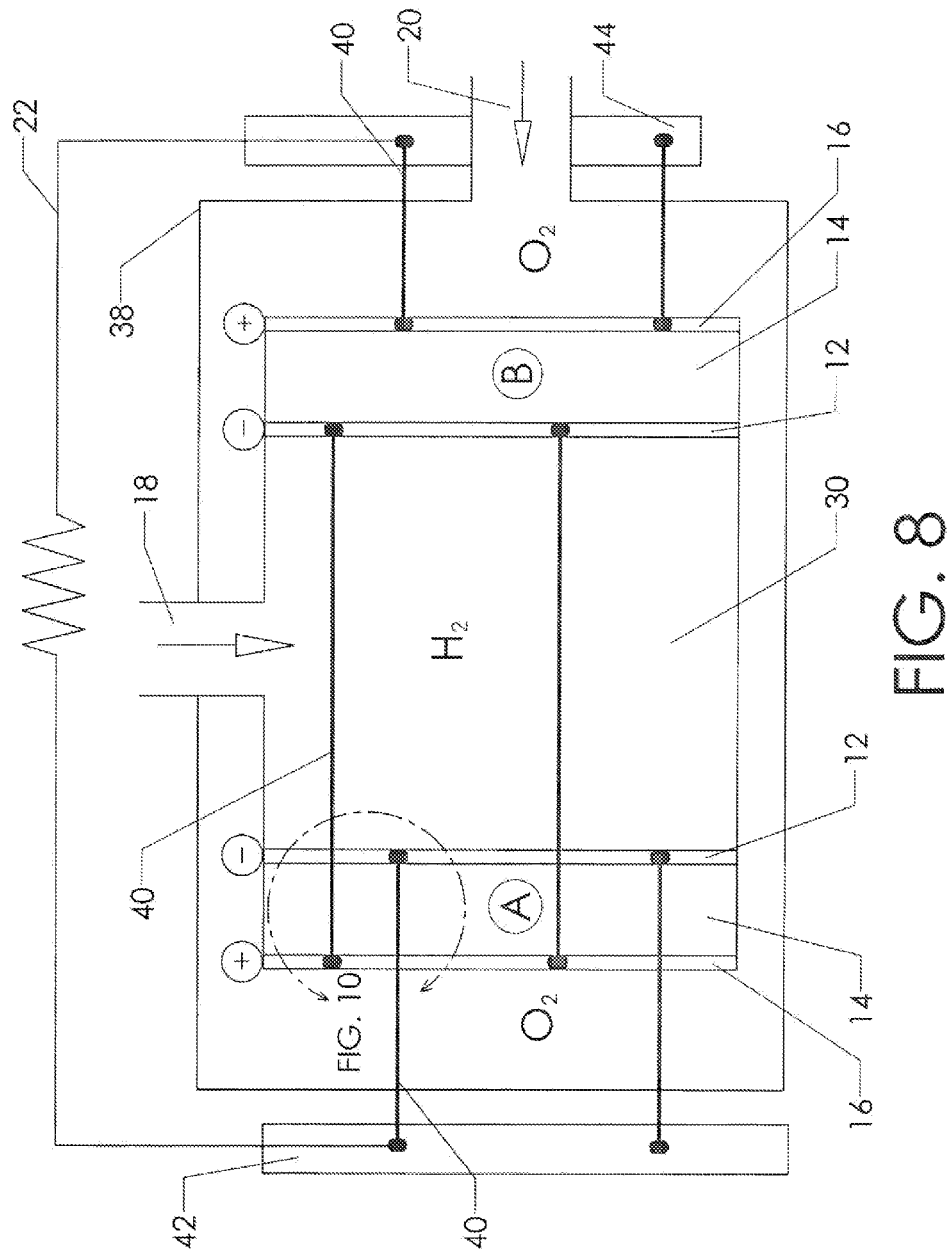
FIG. 8 is a schematic view, showing the use of internal vias to carry electrical current in the present invention.

FIG. 8 schematically depicts this solution. Master anode 42 and master cathode 44 are used to collect the charges. External conductor path 22 passes from the master anode to the master cathode. The master anode and master cathode are connected to the fuel cell anodes and cathodes using the internal vias. Master anode 42 is electrically connected to anode 12 in cell A using one or more vias 40. The vias connecting the master anode to the anode in cell A pass through cathode 16 and electrolyte 14 in cell A. However, these vias are electrically insulated from cathode 16 and electrolyte 14. Further, the vias do not allow any significant amount of gaseous oxygen or hydrogen to leak through the electrolyte. They also provide a positive seal for the electrolyte material itself (especially significant in cases where the electrolyte includes a wetting agent).

One or more vias 40 electrically connect cathode 16 in cell A to anode 12 in cell B. These vias pass through electrolyte 14 and anode 12 in cell A. However, they are electrically insulated from these components. They also provide a positive seal so that no hydrogen gas leaks through the electrolyte along the vias.

Finally, one or more vias 40 electrically connect cathode 16 in cell B to master cathode 44. In studying the circuit path created by the vias in FIG. 8, those skilled in the art will readily perceive that the two cells (A and B) have been stacked in series. The circuit is equivalent to the connections shown in FIG. 7 (apart from the use of "master" anodes and cathodes).

Figure 9:
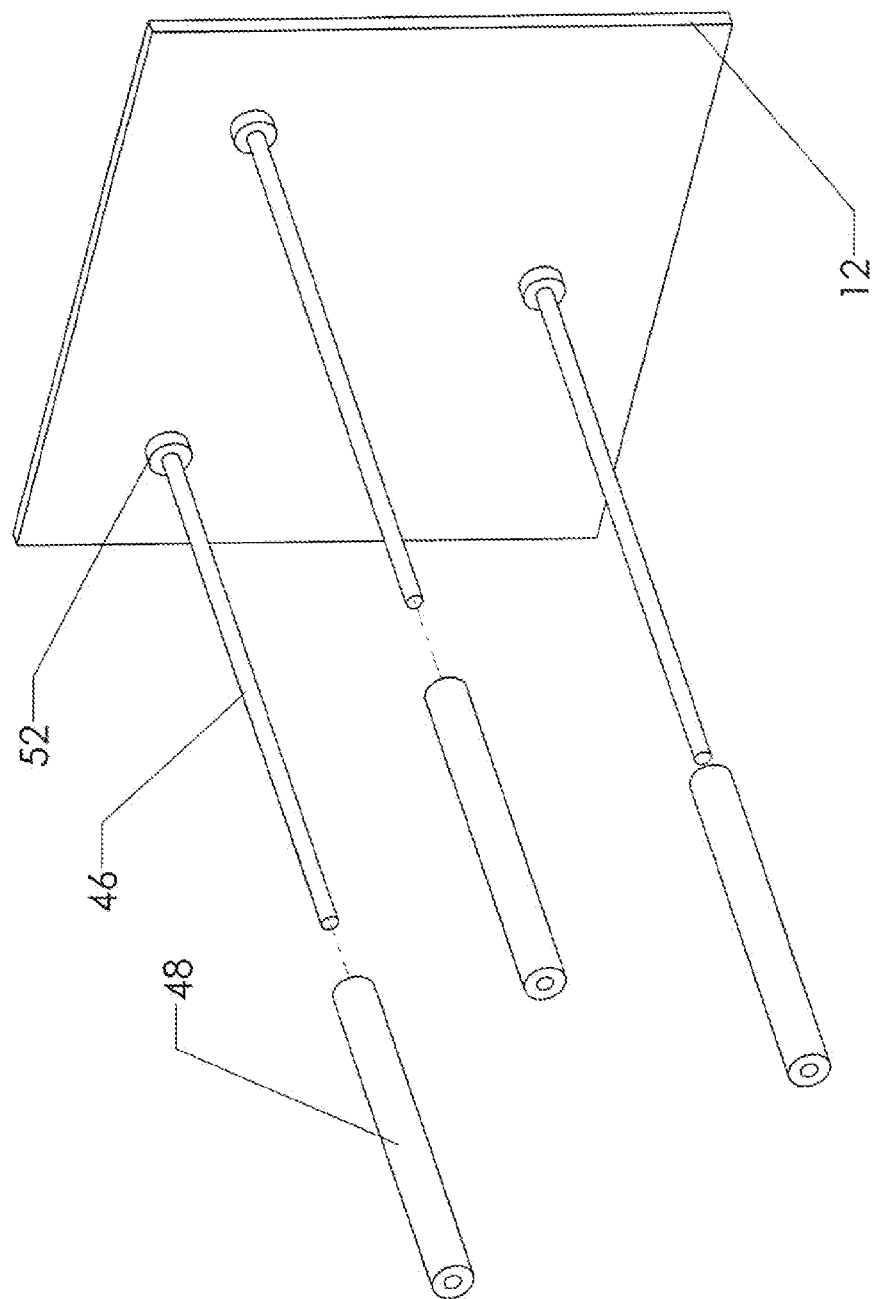
FIG. 9 is an exploded perspective view, showing a simplified depiction of the vias connected to an anode.

The use of the internal vias allows the creation of a "stacked" fuel cell having lower internal resistance losses. FIG. 9 readily illustrates this advantage. FIG. 9 shows how a plurality of vias may be connected to a single anode 12. The exemplary vias are shown in an exploded state. Each via includes a central conductor 46 attached to anode 12 by attachment 52. Insulator 48 slides over conductor 46 and provides electrical insulation as well as the necessary sealing function (separate sealing components may be used as well).

Multiple vias may be distributed across the "face" of each anode or cathode. Each via carries the current to or from an associated region of the anode or cathode. The use of such vias reduces the maximum distance that a particular charge must travel from its point of creation to the conductor that carries it away.

Figure 10:
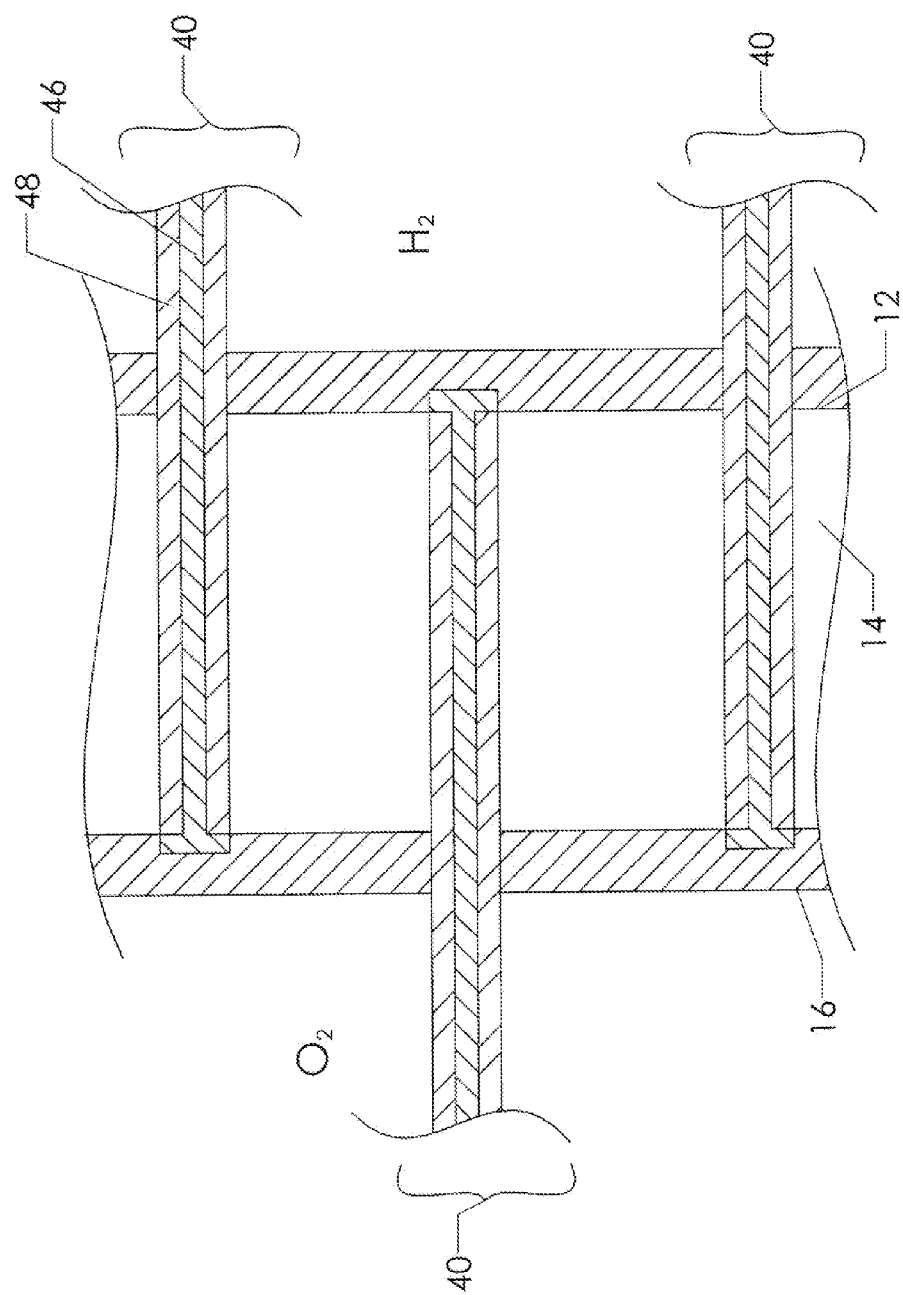
FIG. 10 is a detailed sectional view, showing the vias connected to an anode and a cathode.
Figure 11:
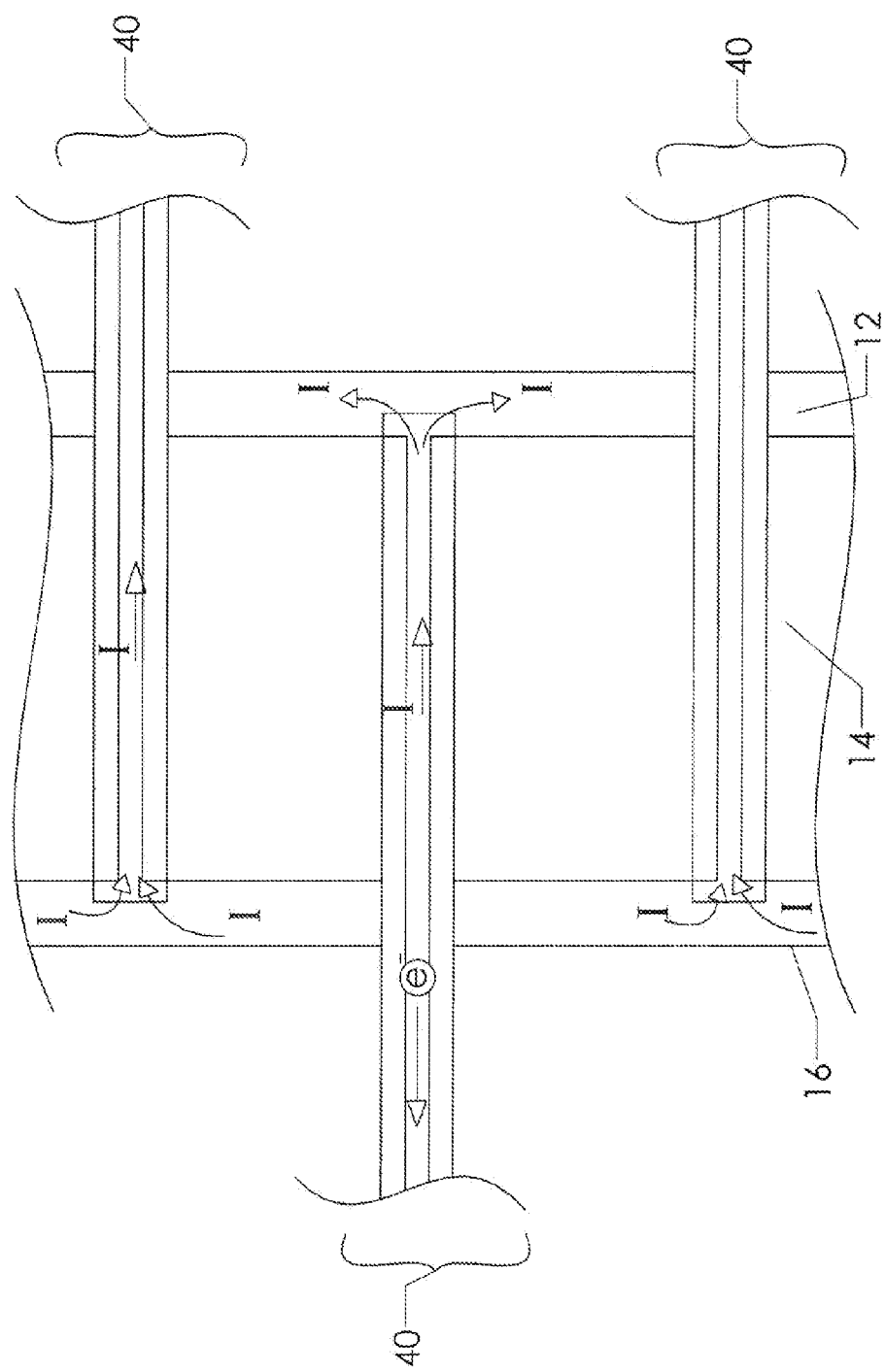
FIG. 11 is a detailed sectional view, showing the current flow through the vias.

FIGS. 10 and 11 illustrate this advantageous concept. FIG. 10 is a detailed sectional elevation view. Its location in the assembly as a whole is noted in FIG. 8. FIG. 10 includes three of the vias (one connecting the anode of cell A to the master anode and two connecting the cathode of cell A to the anode of cell B). The reader will observe how each via 40 includes a central conductor 46 surrounded by an insulator/seal 48. The insulator/seal is positioned to prevent any leakage of the reactants through electrolyte 14. While the reactant-sealing aspect of insulator 48 is obviously significant, the electrical-insulating properties may not be. There are no free electrons in the electrolyte of the fuel cell. Thus, at least for the portions of the vias passing through the electrolyte, it may not be necessary to provide electrical insulation.

One approach could be to provide uninsulated vias through the electrolyte. Contact pads could be placed in the anode and cathode assemblies. These contact pads would make the electrical connection with the exposed end of the via emerging from the electrolyte. Each contact pad would need to be electrically insulated from the balance of the anode or cathode, but this could be done using suitable geometry.

FIG. 11 depicts the current flow through the three vias. In the central via, the flow of electrons is from anode 12 and away (to the left) toward the master anode. Those skilled in the art will know that the current vector proceeds in the opposite direction of the electron flow. Thus, the current vector shown for this via (I) proceeds to the right. Electrical current proceeds from this via into anode 12 and conceptually "spreads" through the anode plate as depicted by the arrows. Conversely, electrical current flows from the plate of cathode 16 and into the two vias leading away to the right.

Figure 12:
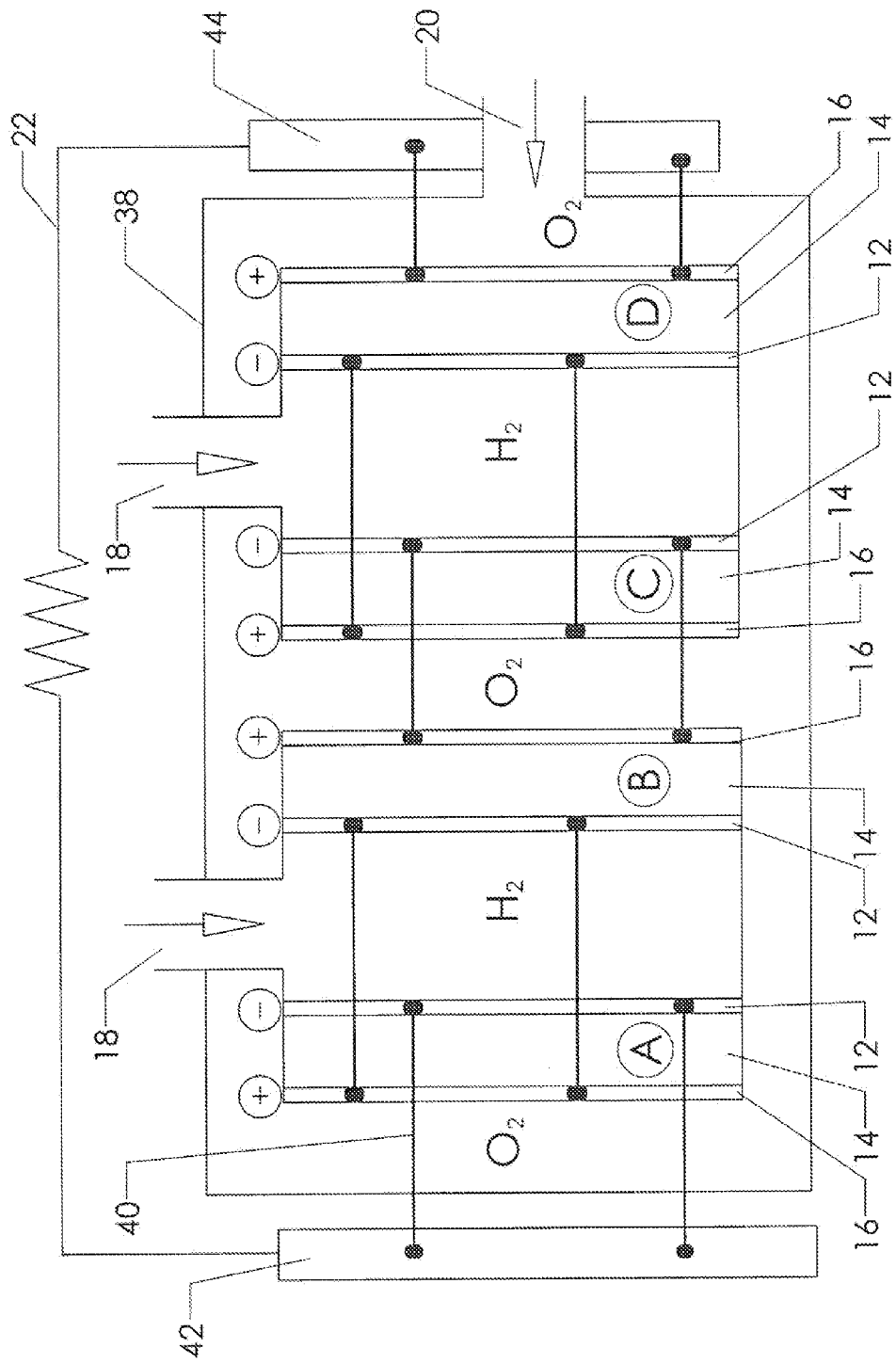
FIG. 12 is a schematic view, showing the vias being used to connect two fuel cells made according to the present invention.

The use of internal vias allows many cells of the inventive design to be stacked in series without experiencing the internal resistance losses that would occur with edge connections. FIG. 12 shows an embodiment of the present invention in which four cells are connected in series. A pair of hydrogen diffusion layer manifolds are fed by a pair of hydrogen inlets 18. Surrounding vessel 38 is again supplied with gaseous oxygen through oxygen inlet 20. The four cells are of course an assembly of two "dual cell modules" within a single vessel 38. The term "dual cell module" is intended to encompass a single gas diffusion layer that is "sandwiched" between a pair of electrolyte assemblies.

Master anode 42 is electrically connected by vias to anode 12 in cell A. Cathode 16 in cell A is electrically connected by vias to anode 12 in Cell B. Cathode 16 in cell B is electrically connected by vias to anode 12 in cell C. Cathode 16 in cell C is electrically connected by vias to anode 12 in cell D. Cathode 16 in cell D is electrically connected by vias to master cathode 44. An external electrical path is then created between master anode 42 and master cathode 44 (including a load that is to be powered by the fuel cell). In this arrangement, a series connection of four individual fuel cells is created within a single vessel 38.

Figure 13:
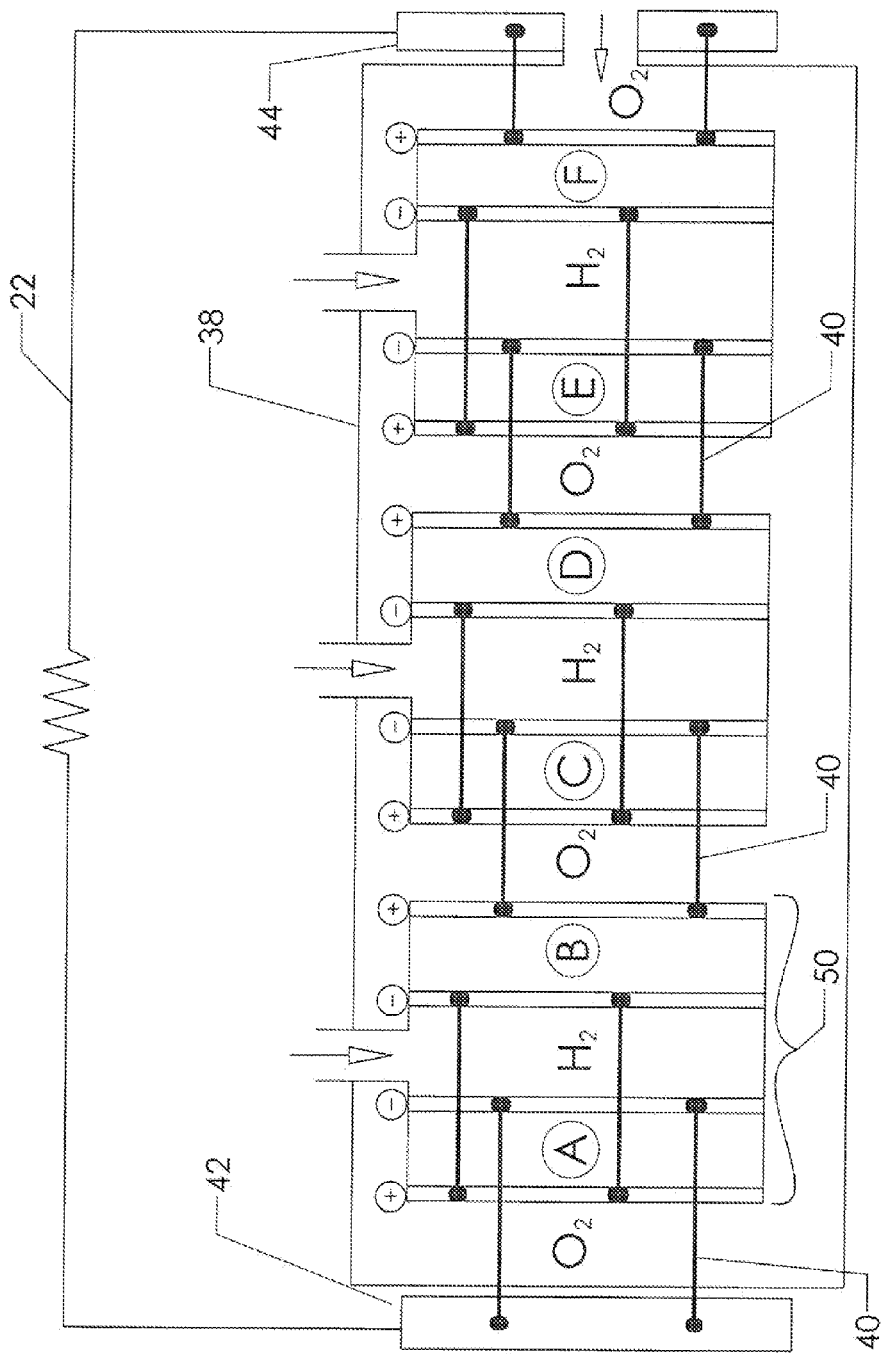
FIG. 13 is a schematic view showing the vias being used to connect three fuel cells made according to the present invention.

Of course, even more individual cells may be connected in series. FIG. 13 shows an assembly in which 6 cells (A-F) are connected in series within a single vessel 38. Within the practicalities of mechanical packaging a much larger stack of cells may also be created.

Figure 14:
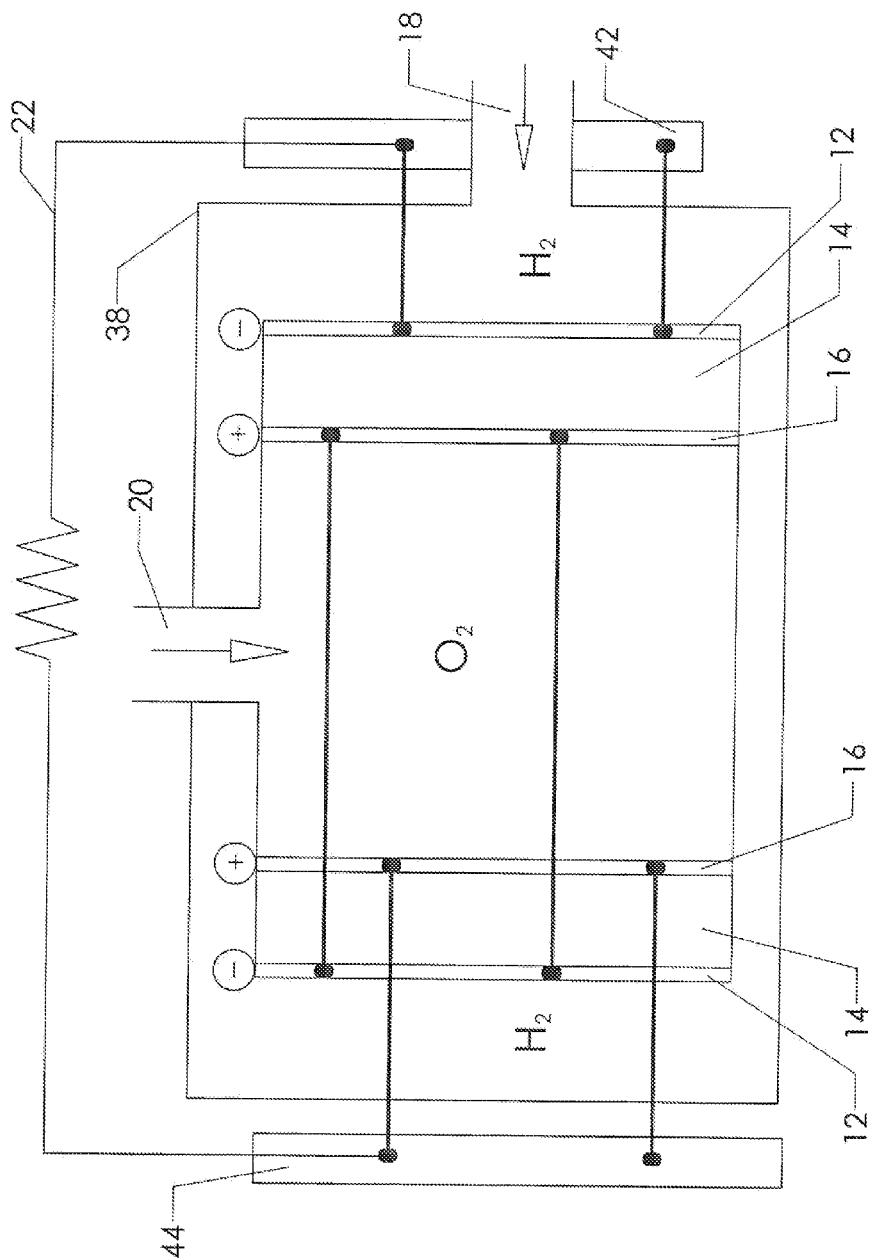
FIG. 14 is a schematic view, showing a fuel cell made according to the present invention in which the locations of the fuel and the oxidizer have been reversed.

The prior exemplary embodiments have all used an oxidizer (diatomic oxygen) in the surrounding container and a fuel (diatomic hydrogen) in the gas diffusion layer within each dual cell module. Of course, the inventive assembly can also be created with the reactants reversed. FIG. 14 shows an embodiment in which gaseous oxygen is fed into the gas diffusion layer within a dual cell module and gaseous hydrogen is fed into the surrounding vessel 38. This particular example is a solid oxide fuel cell. The reader will note, of course, that the position of the anodes and cathodes have been reversed in each electrolyte assembly.

The embodiment of FIG. 14 shows only one dual cell module. However, there is no reason why two or more modules may not be configured in this way, as was illustrated for the prior embodiments.

The embodiments disclosed have been represented in schematic form. Those skilled in the art may tend to think of the electrolyte assemblies as square plates and consequently think of the assembly as a whole as being made of square plates (as is true for conventional "stack" fuel cell assemblies). While one certainly can make the components in a square shape, the invention is by no means limited to such shapes.

Figure 15:
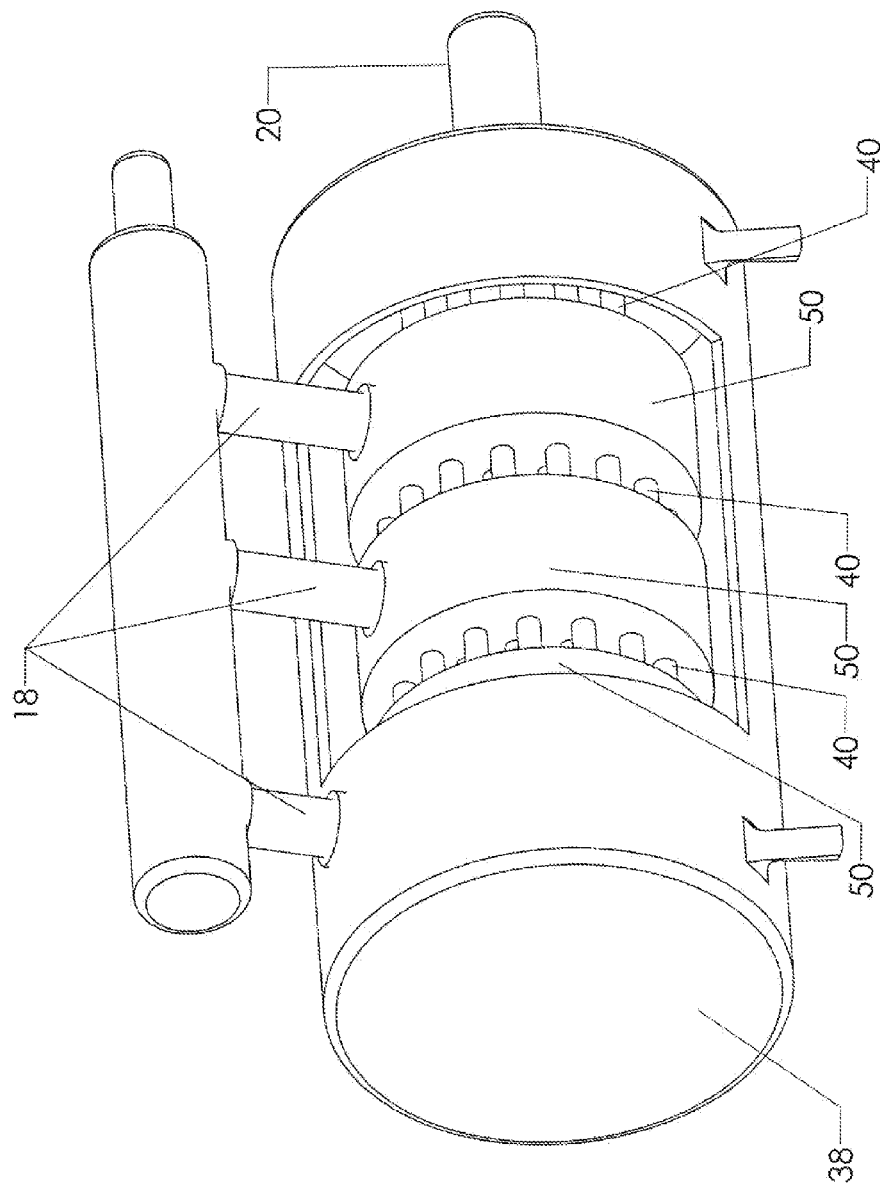
FIG. 15 is a perspective view with a cutaway, showing one possible construction of a fuel cell made according to the present invention.

FIG. 15 shows a cutaway view of an embodiment in which each dual cell module 50 is constructed using a round cross section. In this embodiment, the anode, cathode, electrolyte, and gas diffusion layer are all made with a round cross section. An array of vias connect the multiple dual cell modules 50 together in order to electrically stack them in series. Vessel 38 surrounds the assembly of dual cell modules. Oxygen inlet 20 feeds oxygen into the vessel. A hydrogen manifold feeds gaseous hydrogen to multiple hydrogen inlets 18, each of which feeds a particular dual cell module.

A master anode and master cathode is contained within vessel 38 in this embodiment. Large electrical conductors pass through the walls of the vessel to carry the electrical current to an external load.

The configuration shown in FIG. 15 is not necessarily preferred, and may in fact pose challenges for temperature management and water removal. However, it does serve to demonstrate that the invention can be made using a wide variety of geometric configurations. Further, the embodiment of FIG. 15 shows a more typical arrangement of vias 40 that would be used with an electrolyte assembly having a relatively large surface area. The use of many vias allows the current to be carried from module to module without suffering significant resistance losses.

Many other embodiments are possible. Embodiments of the invention may include one or more of the following features:

1. A group of vias passing through an individual dual cell module may be gathered into a master cathode and master anode for each module. The master cathodes and master anodes could then be linked by large, low-resistance conductors;

2. Switching circuits could be used to add or subtract some of the dual cell modules in a series stack in order to increase or decrease the voltage produced by the assembly;

3. Cooling devices could be added, such as water circulation jackets;

4. Current sensing devices could be added to monitor the output of the fuel cell; and 5. Automated control systems could be added to regulate the reactant flow in order to stabilize the assembly's output.

One of the significant features of the present invention is the ability to test each individual dual cell module for proper function before it is assembled into a larger stack. Referring to FIG. 15, each of the dual cell modules 50 could be connected to supplies of reactant gases and tested for leaks, electrical production, water production, stabilized temperature, etc. In this way manufacturing defects can be found and corrected before a particular dual cell module is assembled into a larger unit.

Although the preceding description contains significant detail, it should not be construed as limiting the scope of the invention but rather as providing illustrations of the preferred embodiments of the invention. One skilled in the art may easily devise variations on the embodiments described. Thus, the scope of the invention should be fixed by the claims rather than the examples given.

Having described my invention, I claim:

1. A fuel cell for creating electricity by reacting a first reactant and a second reactant, comprising:
   a. a first reactant diffusion layer, containing said first reactant;
   b. a first electrolyte assembly in fluid communication with said first reactant in said first reactant diffusion layer, said first electrolyte assembly containing a first anode, a first cathode, and a first electrolyte;
   c. a second electrolyte assembly in fluid communication with said first reactant in said first reactant diffusion layer, said second electrolyte assembly containing a second anode, a second cathode, and a second electrolyte;
   d. a vessel containing said second reactant, said vessel surrounding and completely enclosing said first reactant diffusion layer, said first electrolyte assembly, and said second electrolyte assembly;
   e. a first reactant inlet feeding said first reactant into said first reactant diffusion layer;
   f. a second reactant inlet feeding said second reactant into said vessel;
   g. a master anode;
   h. a master cathode; and
   i. at least one electrical via passing through said first electrolyte and connecting either said first anode to said master anode or said first cathode to said master cathode.

2. A fuel cell for creating electricity as recited in claim 1, wherein:
   a. said first reactant is hydrogen;
   b. said second reactant is oxygen; and
   c. said at least one electrical via connects said first anode to said master anode.

3. A fuel cell for creating electricity as recited in claim 1, wherein:
   a. said first reactant is oxygen;
   b. said second reactant is hydrogen; and
   c. said at least one electrical via connects said first cathode to said master cathode.

4. A fuel cell for creating electricity as recited in claim 2, further comprising a second electrical via passing through said first electrolyte and connecting said first cathode to said second anode.

5. A fuel cell for creating electricity as recited in claim 3, further comprising a second electrical via passing through said first electrolyte and connecting said first anode to said second cathode.

6. A fuel cell for creating electricity as recited in claim 1, further comprising:
   a. wherein said first reactant is hydrogen;
   b. wherein said second reactant is oxygen;
   c. a second reactant diffusion layer, containing said first reactant;
   d. a third electrolyte assembly in fluid communication with said first reactant in said second reactant diffusion layer, said third electrolyte assembly containing a third anode, a third cathode, and a third electrolyte;
   e. a fourth electrolyte assembly in fluid communication with said first reactant in said second reactant diffusion layer, said fourth electrolyte assembly containing a fourth anode, a fourth cathode, and a fourth electrolyte;
   f. said vessel surrounding said second reactant diffusion layer, said third electrolyte assembly, and said fourth electrolyte assembly;
   e. a third reactant inlet feeding said first reactant into said second reactant diffusion layer;
   f. wherein said at least one electrical via connects said first anode to said master anode;
   g. a second electrical via passing through said first electrolyte and connecting said first cathode to said second anode;
   h. a third electrical via passing through said third electrolyte and connecting said third anode to said second cathode; and
   i. a fourth electrical via passing through said third electrolyte and connecting said third cathode to said fourth anode.

7. A fuel cell for creating electricity as recited in claim 1, further comprising:
   a. wherein said first reactant is oxygen;
   b. wherein said second reactant is hydrogen;
   c. a second reactant diffusion layer, containing said first reactant;
   d. a third electrolyte assembly in fluid communication with said first reactant in said second reactant diffusion layer, said third electrolyte assembly containing a third anode, a third cathode, and a third electrolyte;

e. a fourth electrolyte assembly in fluid communication with said first reactant in said second reactant diffusion layer, said fourth electrolyte assembly containing a fourth anode, a fourth cathode, and a fourth electrolyte;

f. said vessel surrounding said second reactant diffusion layer, said third electrolyte assembly, and said fourth electrolyte assembly;

e. a third reactant inlet feeding said first reactant into said second reactant diffusion layer;

f. wherein said at least one electrical via connects said first cathode to said master cathode;

g. a second electrical via passing through said first electrolyte and connecting said first anode to said second cathode;

h. a third electrical via passing through said third electrolyte and connecting said third cathode to said second anode; and i. a fourth electrical via passing through said third electrolyte and connecting said third anode to said fourth cathode.

8. A fuel cell for creating electricity as recited in claim 2, further comprising a second electrical via passing through said first electrolyte, wherein said second electrical via also connects said first anode to said master anode.

9. A fuel cell for creating electricity as recited in claim 8, further comprising a third electrical via passing through said first electrolyte, wherein said third electrical via also connects said first anode to said master anode.

10. A fuel cell for creating electricity as recited in claim 3, further comprising a second electrical via passing through said first electrolyte, wherein said second electrical via also connects said first cathode to said master cathode.

11. A fuel cell for creating electricity by reacting a first reactant and a second reactant, comprising:
   a. a first reactant diffusion layer, containing said first reactant;
   b. a first electrolyte assembly in fluid communication with said first reactant in said first reactant diffusion layer, said first electrolyte assembly containing a first anode, a first cathode, and a first electrolyte;
   c. a second electrolyte assembly in fluid communication with said first reactant in said first reactant diffusion layer, said second electrolyte assembly containing a second anode, a second cathode, and a second electrolyte;
   d. a pressure-tight vessel containing said second reactant, said vessel in fluid communication with said first electrolyte assembly and said second electrolyte assembly and completely surrounding said first electrolyte assembly and said second electrolyte assembly;
   e. a first reactant inlet feeding said first reactant into said first reactant diffusion layer;
   f. a second reactant inlet feeding said second reactant into said vessel;
   g. a master anode;
   h. a master cathode;
   i. at least one electrical via passing through said first electrolyte and connecting either said first anode to said master anode or said first cathode to said master cathode.

12. A fuel cell for creating electricity as recited in claim 11, wherein:
   a. said first reactant is hydrogen;
   b. said second reactant is oxygen; and
   c. said at least one electrical via connects said first anode to said master anode.

13. A fuel cell for creating electricity as recited in claim 11, wherein:
   a. said first reactant is oxygen;
   b. said second reactant is hydrogen; and
   c. said at least one electrical via connects said first cathode to said master cathode.

14. A fuel cell for creating electricity as recited in claim 12, further comprising a second electrical via passing through said first electrolyte and connecting said first cathode to said second anode.

15. A fuel cell for creating electricity as recited in claim 13, further comprising a second electrical via passing through said first electrolyte and connecting said first anode to said second cathode.

16. A fuel cell for creating electricity as recited in claim 11, further comprising:
   a. wherein said first reactant is hydrogen;
   b. wherein said second reactant is oxygen;
   c. a second reactant diffusion layer, containing said first reactant;
   d. a third electrolyte assembly in fluid communication with said first reactant in said second reactant diffusion layer, said third electrolyte assembly containing a third anode, a third cathode, and a third electrolyte;
   e. a fourth electrolyte assembly in fluid communication with said first reactant in said second reactant diffusion layer, said fourth electrolyte assembly containing a fourth anode, a fourth cathode, and a fourth electrolyte;
   f. said vessel in fluid communication with said third electrolyte assembly and said fourth electrolyte assembly;
   e. a third reactant inlet feeding said first reactant into said second reactant diffusion layer;
   f. wherein said at least one electrical via connects said first anode to said master anode;
   g. a second electrical via passing through said first electrolyte and connecting said first cathode to said second anode;
   h. a third electrical via passing through said third electrolyte and connecting said third anode to said second cathode; and
   i. a fourth electrical via passing through said third electrolyte and connecting said third cathode to said fourth anode.

17. A fuel cell for creating electricity as recited in claim 11, further comprising:
   a. wherein said first reactant is oxygen;
   b. wherein said second reactant is hydrogen;
   c. a second reactant diffusion layer, containing said first reactant;
   d. a third electrolyte assembly in fluid communication with said first reactant in said second reactant diffusion layer, said third electrolyte assembly containing a third anode, a third cathode, and a third electrolyte;
   e. a fourth electrolyte assembly in fluid communication with said first reactant in said second reactant diffusion layer, said fourth electrolyte assembly containing a fourth anode, a fourth cathode, and a fourth electrolyte;
   f. said vessel surrounding said second reactant diffusion layer, said third electrolyte assembly, and said fourth electrolyte assembly;
   e. a third reactant inlet feeding said first reactant into said second reactant diffusion layer;
   f. wherein said at least one electrical via connects said first cathode to said master cathode;
   g. a second electrical via passing through said first electrolyte and connecting said first anode to said second cathode;
   h. a third electrical via passing through said third electrolyte and connecting said third cathode to said second anode; and i. a fourth electrical via passing through said third electrolyte and connecting said third anode to said fourth cathode.

18. A fuel cell for creating electricity as recited in claim 12, further comprising a second electrical via passing through said first electrolyte, wherein said second electrical via also connects said first anode to said master anode.

19. A fuel cell for creating electricity as recited in claim 18, further comprising a third electrical via passing through said first electrolyte, wherein said third electrical via also connects said first anode to said master anode.

20. A fuel cell for creating electricity as recited in claim 13, further comprising a second electrical via passing through said first electrolyte, wherein said second electrical via also connects said first cathode to said master cathode.

* * * * *